May 29, 1962 E. FOURCADE (HARISPURU) 3,037,098
PARKING SIGNAL
Filed Nov. 28, 1958
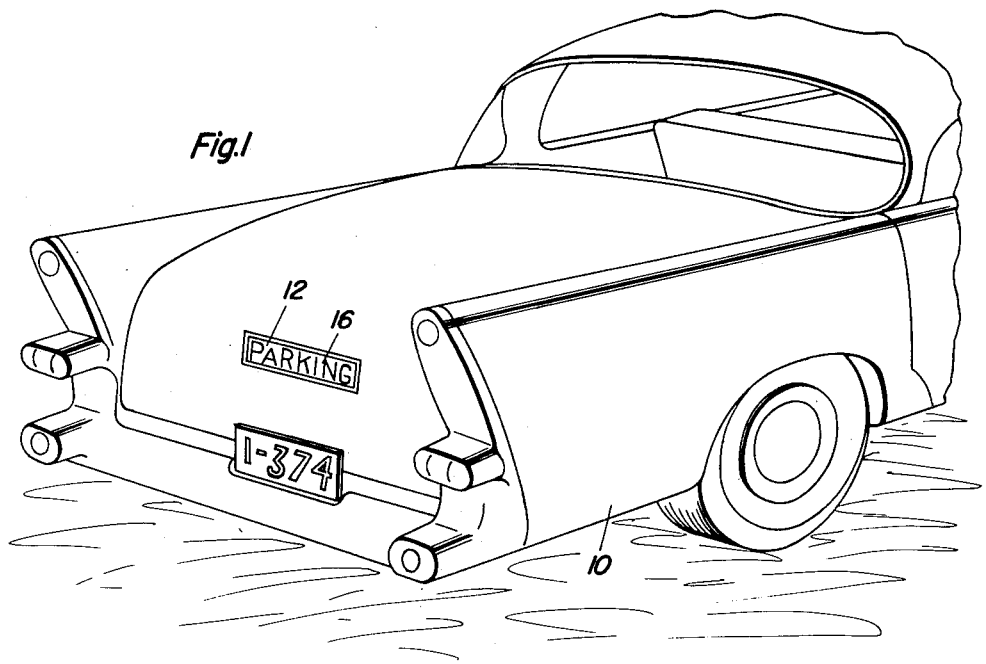
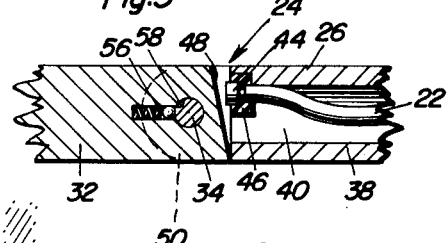
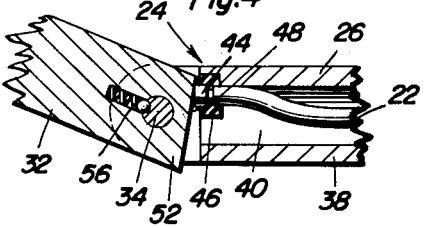
Enrique Fourcade (Harispuru)
INVENTOR.
BY
Attorneys 3,037,098
PARKING SIGNAL
Enrique Fourcade (Harispuru), Apartado Postal 28,
Guaymas, Sonora, Mexico
Filed Nov. 28, 1958, Ser. No. 777,086
4 Claims. (Cl. 200—61.27)

This invention relates to a parking signal and more particularly to a sparkling light with a sign in prominent letters stating the word "parking" to be placed on the rear of the motor vehicle and to be used only when the motorist is parking his automobile so that the operators of automobiles to the rear thereof will know what is taking place and will not stop behind the car with the "parking" light, waiting for it to start up again.

An object of the invention is to provide a prominent light at the rear of a motor vehicle to be operated conveniently from the interior of the car and preferably by manipulation of the same lever that the directional lights in the motor vehicle are operated by. The invention contemplates an amber, sparkling light with the word "parking" in prominent, preferably capital letters at the rear of a motor vehicle. The invention also contemplates an improvement in the method of lighting such a light, this entailing the use of the ordinary manually operated lever that is used for actuating the turn signal lights of a motor vehicle. This lever would be operated in a different direction from that required to turn the turn signal lights on to either the left or the right signalling position.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a fragmentary perspective view of the rear of a motor vehicle fitted with a light constructed in accordance with the invention;

FIGURE 2 is a fragmentary perspective view of a steering wheel and turn signal control lever modified to actuate a switch that controls the energizing of the one or more lamps in the "parking" light at the rear of the motor vehicle in FIGURE 1.

FIGURE 3 is an enlarged fragmentary sectional view taken substantially on the line 3—3 of FIGURE 2.

FIGURE 4 is an enlarged fragmentary sectional view similar to that of FIGURE 3 but showing the switch in the closed position.

FIGURE 5 is a schematic wiring diagram showing one suggested method of connecting the parking light in the motor vehicle electrical system.

In the accompanying drawings there is a typical motor vehicle 10. Although an automobile is shown it is to be understood that the principles of the invention are applicable to other motor vehicles, such as trucks, buses, etc. This motor vehicle has a lamp structure or light 12 on the rear part of the deck lid, with the light including a light housing and a reflective type lens so that a sparkling light is given off when the lamp 14 is energized. This lamp is installed in the casing of the light 12 and behind the lens 16. It is preferred that the lens be amber colored, although other colors will suffice. It is also preferred that the word "parking" in prominent letters be clearly displayed by being formed in or otherwise connected with the lens 16.

As shown in FIGURE 5, the lamp 14 and the parallel instrument panel mounted lamp 15 have conductor 22 connecting them to a source 20 of electrical potential through switches 24 and 25. Switch 25 is the ignition switch of the vehicle so that the lamp circuit is opened when the ignition switch is turned off. Switch 24 is a special switch installed in the conductive lever 26 of the turn signal assembly 28 of the motor vehicle 10. The turn signal lever is ordinarily pushed up or down to intermittently energize light bulbs at the rear of the motor vehicle to signal left and right turns. By moving the outer end of the lever 26 in a different direction, for example slightly toward or away from the steering wheel 30, the outer part 32 of lever 26 is moved about a pivot pin 34 to a new position. The lever 26 can be made in two sections or parts 32 and 38 and connected together by the pivot 34, with the inner part 38 being conventional and unaltered so that the normal operation of the turn signal equipment is unchanged.

As shown in FIGURES 3 and 4 the inner part 38 of the lever 26 has a passage 40 through which electric conductor 22 is passed. The electric conductor has a contact 44 at its inner end with the contact held in place in a block or grommet of insulation 46. The grommet is carried by the part 38 of lever 26 and located in the path of travel of surface 48 of part 32 confronting the contact 44.

Pivot 34 constitutes a part of a hinge made by having bifurcations 50 at the outer end of part 38 and having a tongue or ear 52 at the inner end of part 32. The pin 34 passes through the bifurcations and ear thereby constituting the hinge.

Part 32 is held in the normally extending position in alignment with part 38 by detent 56 that is carried by part 32 and that has its ball bearing against the surface of pin 34. When part 32 is pivoted to the switch closing position (FIGURE 4) the detent snaps into the recess 58 that is in the surface of pin 34 and holds the part 32 in a position with surface 48 thereof pressed against contact 44. This position establishes a ground path for the circuit shown in FIGURE 5 through the lever 26. Accordingly, the electric lamp 14 will be energized until the part 32 is moved to the position shown in FIGURE 3 which is in alignment with the inner part 38 of the lever.

Various changes and modifications may be made without departing from the invention. For example a flasher may be interposed in the conductor 32 at an appropriate place so that a blinking signal will be given. Other modifications that fall within the scope of the following claims may be resorted to.

What is claimed as new is as follows:

1. In a motor vehicle turn signal system, a switch arm having a first part and a second part, means pivotally connecting said parts together at adjacent ends for pivotal movement restricted essentially to a single plane, means connected with one of said switch arm parts for releasably holding one part in a predetermined pivoted position, and contact means between said parts of said arm which are engaged when said parts are held in said predetermined pivoted position, said means pivotally connecting said parts together at the adjacent ends for pivotal movement restricted essentially to a single plane including bifurcations at one end of one of said parts, the other of said parts having an end located between said bifurcations, and a hinge pin connected between said bifurcations and said end of said arm located between said bifurcations, said means for releasably holding one part in the predetermined pivoted position comprising a detent connected between said hinge pin and one of said parts of said switch arm.

2. Common means for manually controlling, independently of each other, a pair of electric vehicle signals, one of said signals having a control switch electrically connected thereto, said means comprising an operating lever including a pivoted inner section swingable in a given plane on the switch and operatively connected thereto for controlling one of the signals, and a switch on the outer end portion of said inner section electrically connected to the other signal, said lever further including an outer section pivotally mounted on the inner section for swinging movement in a given plane at right angles to the first named plane and operatively connected to the last named switch, and coacting means on the inner and outer sections for releasably securing said outer section in circuit-closing position.

3. Common means for manually controlling, independently of each other, a pair of electric vehicle signals, one of said signals having a control switch electrically connected thereto, said means comprising an operating lever of conductive material including an inner section having one end pivotally connected to the switch for swinging movement in a given plane and operatively connected to said switch, furcations on the other end of said inner section, an electric contact on said inner section insulated therefrom between the furcations and electrically connected to the other signal, a pin extending between the furcations, said lever further including an outer section comprising on one end an ear journaled on the pin for mounting said outer section on the inner section for swinging movement in a given plane at right angles to the first named plane and engageable with the contact for grounding same, and means for releasably securing said outer section in operative position.

4. Common means for manually controlling, independently of each other, a pair of electric vehicle signals, one of said signals having a control switch electrically connected thereto, said means comprising an operating lever of conductive material including an inner section having one end pivotally connected to the switch for swinging movement in a given plane and operatively connected to said switch, furcations on the other end of said inner section, an electric contact on said inner section insulated therefrom between the furcations and electrically connected to the other signal, a pin extending between the furcations, said lever further including an outer section comprising on one end an ear journaled on the pin for mounting said outer section on the inner section for swinging movement in a given plane at right angles to the first named plane and engageable with the contact for grounding same, and means for releasably securing said outer section in operative position, said pin having a socket therein at an intermediate point, said securing means comprising a spring-actuated ball detent mounted in said outer section and engageable in the socket.

References Cited in the file of this patent

UNITED STATES PATENTS

| | | |
|---|---|---|
| 1,444,742 | Guenther | Feb. 16, 1923 |
| 1,775,585 | Bobroff | Sept. 9, 1930 |
| 2,130,090 | Imhofe | Sept. 13, 1938 |
| 2,338,748 | Watkiss | Jan. 11, 1944 |
| 2,667,627 | Hollins | Jan. 26, 1954 |
| 2,796,483 | Wolf | June 18, 1957 |
| 2,813,942 | Binder | Nov. 19, 1957 |
| 2,864,074 | McGowan | Dec. 9, 1958 |
| 2,866,175 | Slater | Dec. 23, 1958 |
| 2,870,299 | Cox | Jan. 20, 1959 |

FOREIGN PATENTS

| | | |
|---|---|---|
| 1,060,111 | France | Nov. 18, 1953 |